US009128737B2

(12) United States Patent
Sipe et al.

(10) Patent No.: US 9,128,737 B2
(45) Date of Patent: Sep. 8, 2015

(54) DYNAMIC PROFILE SWITCHING BASED ON USER IDENTIFICATION

(75) Inventors: Michael Andrew Sipe, Pittsburgh, PA (US); Hugo Barra, Mountain View, CA (US); Henry Will Schneiderman, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/466,611

(22) Filed: May 8, 2012

(65) Prior Publication Data

US 2013/0097695 A1 Apr. 18, 2013

Related U.S. Application Data (60) Provisional application No. 61/548,430, filed on Oct. 18, 2011.

(51) Int. Cl.
*G06F 21/00* (2013.01)
*H04N 5/225* (2006.01)
*G06F 9/445* (2006.01)
(Continued)

(52) U.S. Cl.
CPC ......... *G06F 9/4451* (2013.01); *H04M 1/72569* (2013.01); *G06F 21/32* (2013.01); *H04M 2250/52* (2013.01)

(58) Field of Classification Search
CPC ................... H04L 29/06836; H04L 29/08936; H04L 67/306; H04N 5/225; H04M 1/72569; H04M 2250/52
USPC ........................................................ 709/204
See application file for complete search history.

(56) References Cited

U.S. PATENT DOCUMENTS 5,754,939 A * 5/1998 Herz et al. .................... 455/3.04
6,256,633 B1 * 7/2001 Dharap ................................ 1/1
(Continued)

FOREIGN PATENT DOCUMENTS

WO 0232136 A2 4/2002
WO 2005022473 3/2005

OTHER PUBLICATIONS

Zhang, "Delivery of Personalized and Adaptive Content to Mobile Devices: A Framework and Enabling Technology", Communications of the Association for Information Systems, vol. 13, 2003, pp. 183-202.*

(Continued)

*Primary Examiner* — Andrew Nalven
*Assistant Examiner* — Walter Malinowski
(74) *Attorney, Agent, or Firm* — Morris & Kamlay LLP (57) ABSTRACT

A method for dynamic switching of user profiles on a computing device. The computing device is coupled to at least one image-sensing device and can be configured using a plurality of stored user profiles. The method includes receiving at least one image from the at least one image-sensing device and generating a current user value based on the at least one received image. The method further includes determining if the current user value corresponds to at least one stored user value corresponding to a stored user profile. If the current user value corresponds to at least one stored user value, the method includes retrieving the stored user profile and configuring at least some programs operating on the computing device using the retrieved user profile. If the current user value does correspond to at least one stored user value, the method includes configuring the computing device using an alternative method.

16 Claims, 4 Drawing Sheets

(51) Int. Cl.
*H04M 1/725* (2006.01)
*G06F 21/32* (2013.01)

(56) References Cited

U.S. PATENT DOCUMENTS

| | | | |
|---|---|---|---|
| 6,765,470 B2 | 7/2004 | Shinzaki | |
| 7,130,454 B1* | 10/2006 | Berube et al. | 382/118 |
| 7,194,114 B2 | 3/2007 | Schneiderman | |
| 7,492,925 B2 | 2/2009 | Silvester | |
| 7,551,755 B1* | 6/2009 | Steinberg et al. | 382/118 |
| 7,602,948 B2 | 10/2009 | Ito | |
| 7,630,522 B2 | 12/2009 | Popp et al. | |
| 7,848,566 B2 | 12/2010 | Schneiderman | |
| 8,064,688 B2 | 11/2011 | Schneiderman | |
| 8,140,403 B2* | 3/2012 | Ramalingam et al. | 705/26.1 |
| 8,261,090 B1 | 9/2012 | Matsuoka | |
| 8,325,995 B1* | 12/2012 | Bowers et al. | 382/115 |
| 2002/0032768 A1* | 3/2002 | Voskuil | 709/224 |
| 2002/0152255 A1* | 10/2002 | Smith et al. | 709/102 |
| 2003/0093430 A1* | 5/2003 | Mottur | 707/10 |
| 2003/0103088 A1* | 6/2003 | Dresti et al. | 345/835 |
| 2003/0126121 A1 | 7/2003 | Khan et al. | |
| 2003/0227478 A1* | 12/2003 | Chatfield | 345/751 |
| 2004/0015445 A1* | 1/2004 | Heaven et al. | 705/51 |
| 2004/0259536 A1 | 12/2004 | Keskar et al. | |
| 2005/0060554 A1* | 3/2005 | O'Donoghue | 713/183 |
| 2005/0210270 A1* | 9/2005 | Rohatgi et al. | 713/186 |
| 2006/0069749 A1* | 3/2006 | Herz et al. | 709/219 |
| 2006/0135139 A1 | 6/2006 | Cheng et al. | |
| 2007/0067252 A1* | 3/2007 | Hengerer et al. | 707/1 |
| 2007/0140532 A1* | 6/2007 | Goffin | 382/118 |
| 2007/0198286 A1 | 8/2007 | Tomita | |
| 2007/0261116 A1* | 11/2007 | Prafullchandra et al. | 726/22 |
| 2008/0113786 A1* | 5/2008 | Alderucci et al. | 463/29 |
| 2008/0167071 A1 | 7/2008 | Forstall et al. | |
| 2009/0029780 A1* | 1/2009 | Amaitis et al. | 463/43 |
| 2009/0138805 A1* | 5/2009 | Hildreth | 715/745 |
| 2009/0170552 A1 | 7/2009 | Lin et al. | |
| 2009/0284532 A1* | 11/2009 | Kerr et al. | 345/442 |
| 2009/0313053 A1* | 12/2009 | Gengarella et al. | 705/5 |
| 2010/0077090 A1* | 3/2010 | Cohen | 709/228 |
| 2010/0095348 A1* | 4/2010 | Foster et al. | 726/1 |
| 2010/0125906 A1* | 5/2010 | Golle et al. | 726/18 |
| 2010/0141778 A1 | 6/2010 | Basson et al. | |
| 2010/0174751 A1 | 7/2010 | Kawano et al. | |
| 2010/0208950 A1 | 8/2010 | Silvester | |
| 2010/0227684 A1* | 9/2010 | Walker et al. | 463/29 |
| 2010/0299530 A1* | 11/2010 | Bell et al. | 713/186 |
| 2011/0022694 A1* | 1/2011 | Dalal et al. | 709/222 |
| 2011/0176667 A1* | 7/2011 | Kumar | 379/142.04 |
| 2011/0292181 A1* | 12/2011 | Acharya et al. | 348/47 |
| 2011/0317872 A1 | 12/2011 | Free | |
| 2012/0011085 A1* | 1/2012 | Kocks et al. | 706/12 |
| 2012/0023400 A1* | 1/2012 | Freeman et al. | 715/273 |
| 2012/0148117 A1* | 6/2012 | Chang | 382/118 |
| 2012/0306991 A1* | 12/2012 | DeGrazia et al. | 348/14.03 |
| 2013/0027571 A1* | 1/2013 | Parulski | 348/207.11 |
| 2013/0097416 A1* | 4/2013 | Barra et al. | 713/100 |

OTHER PUBLICATIONS

IPRP of PCT/US2012/060852 dated Apr. 22, 2014.
ISR of PCT/US2012/060852 dated Mar. 29, 2013.
Written Opinion of the International Searching Authority of PCT/US2012/060852 dated Mar. 29, 2013.
Extended European Search Report, issued Apr. 1, 2015 in corresponding European Application No. 12 84 1308.

* cited by examiner

DYNAMIC PROFILE SWITCHING BASED ON USER IDENTIFICATION

CROSS-REFERENCE TO RELATED APPLICATION

This application claims the benefit of U.S. Provisional Patent Application No. 61/548,430, filed Oct. 18, 2011, which is hereby incorporated by reference in its entirety. This application is related to U.S. patent application Ser. No. 13/402,221, filed Feb. 22, 2012.

TECHNICAL FIELD

The present disclosure relates in general to user profiles on computing devices and in particular to dynamically switching user profiles based on user identification.

BACKGROUND

Computing devices such as mobile telephones, tablets, and laptops have proliferated in recent years. These devices can be equipped with processors, memory, and the capability to communicate through local and wide area networks, including the Internet. With some computing devices, the user of the computing device can establish a user profile and store a set of preferences for operating the computing device in the user profile. The user profile can include the files and folders saved by the user; the applications, software, programs, etc. downloaded to the computing device by the user; security settings for loading the user profile; operation restrictions for the user; layout of the display of the computing device including font size, icon size, type of wallpaper, etc.; and any other items or settings for operation of the user profile on the computing device.

SUMMARY

Disclosed herein are methods and an apparatus for dynamic switching of user profiles on a computing device.

One aspect of the disclosed embodiments is a method of operating a computing device coupled to at least one image-sensing device and using a plurality of stored user profiles. Each stored user profile can be associated with at least one stored user value indicative of a user. The method includes receiving at least one image from the at least one image-sensing device and generating a current user value indicative of a current user of the computing device based on the at least one received image. The method further includes determining if the current user value corresponds to the at least one stored user value, retrieving the stored user profile having the stored user value corresponding to the current user value if the current user value corresponds to the at least one stored user value, configuring at least some programs operating on the computing device using the retrieved user profile, and configuring at least some programs operating on the computing device using a guest profile if the current user value does not correspond to the at least one stored user value.

Another aspect of the disclosed embodiments is a method of operating a computing device coupled to at least one image-sensing device and using a plurality of stored user profiles. Each stored user profile can be associated with at least one stored user value indicative of a user. The method includes receiving at least one image from the at least one image-sensing device and generating a current user value indicative of a current user of the computing device based on the at least one received image. The method further includes determining if the current user value corresponds to the at least one stored user value, retrieving the stored user profile having the stored user value corresponding to the current user value if the current user value corresponds to the at least one stored user value, configuring at least some programs operating on the computing device using the stored user profile if the stored user profile is retrieved, and displaying an interface for establishing a user profile for the current user if the current user value does not correspond to the at least one stored user value.

Another aspect of the disclosed embodiments is a method of operating a computing device coupled to at least one image-sensing device and using a plurality of stored user profiles. Each stored user profile can be associated with at least one stored user value indicative of a user. The method includes receiving at least one image from the at least one image-sensing device and generating a current user value indicative of a current user of the computing device based on the at least one received image. The method further includes determining if the current user value corresponds to the at least one stored user value, retrieving the stored user profile having the stored user value corresponding to the current user value if the current user value corresponds to the at least one stored user value, and configuring at least some programs operating on the computing device using the stored user profile if the stored user profile is retrieved. The method further includes displaying at least one indicator of at least one stored user profile for selection by the current user if the current user value does not correspond to the at least one stored user value, receiving a signal selecting a stored user profile, retrieving the selected user profile, and configuring at least some programs operating on the computing device using the retrieved user profile.

Another aspect of the disclosed embodiments is a computing device using a plurality of stored user profiles. Each stored user profile can be associated with at least one stored user value indicative of a user. The computing device includes an input-output device, at least one image-sensing device, a memory, and one or more processors. The one or more processors are configured to execute instructions stored in the memory to receive at least one image from the at least one image-sensing device and generate a current user value indicative of a current user of the computing device based on the at least one received image. The one or more processors are further configured to determine if the current user value corresponds to the at least one stored user value, retrieve the stored user profile having the stored user value corresponding to the current user value if the current user value corresponds to the at least one stored user value, configure at least some programs operating on the computing device using the retrieved user profile, and configure at least some programs operating on the computing device using a guest profile if the current user value does not correspond to the at least one stored user value.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

As computing devices proliferate, so do the number of users operating each computing device. Some device users can find some traditional methods of loading and operating a user profile cumbersome, such as providing a username and password, if the computing device includes a limited user interface. Some device users can also find some traditional methods of accessing a user profile difficult to execute. Some device users can be incapable of complying with some traditional methods but still need to be provided a specific user profile. For example, a young child can share a computing device with a parent and be capable of running some games and applications on the computing device and at the same time be incapable of entering a username and password.

The apparatuses and methods described herein in some cases allow for configuring at least some programs operating on a computing device using a retrieved user profile. Configuring a computing device using a retrieved user profile can limit access to the files, folders, applications, security settings, etc. of other users of the computing device having stored user profiles while loading the files, folders, applications, security settings, etc. of the retrieved user profile without requiring the user to manually enter information to load and operate the retrieved user profile.

Figure 1:
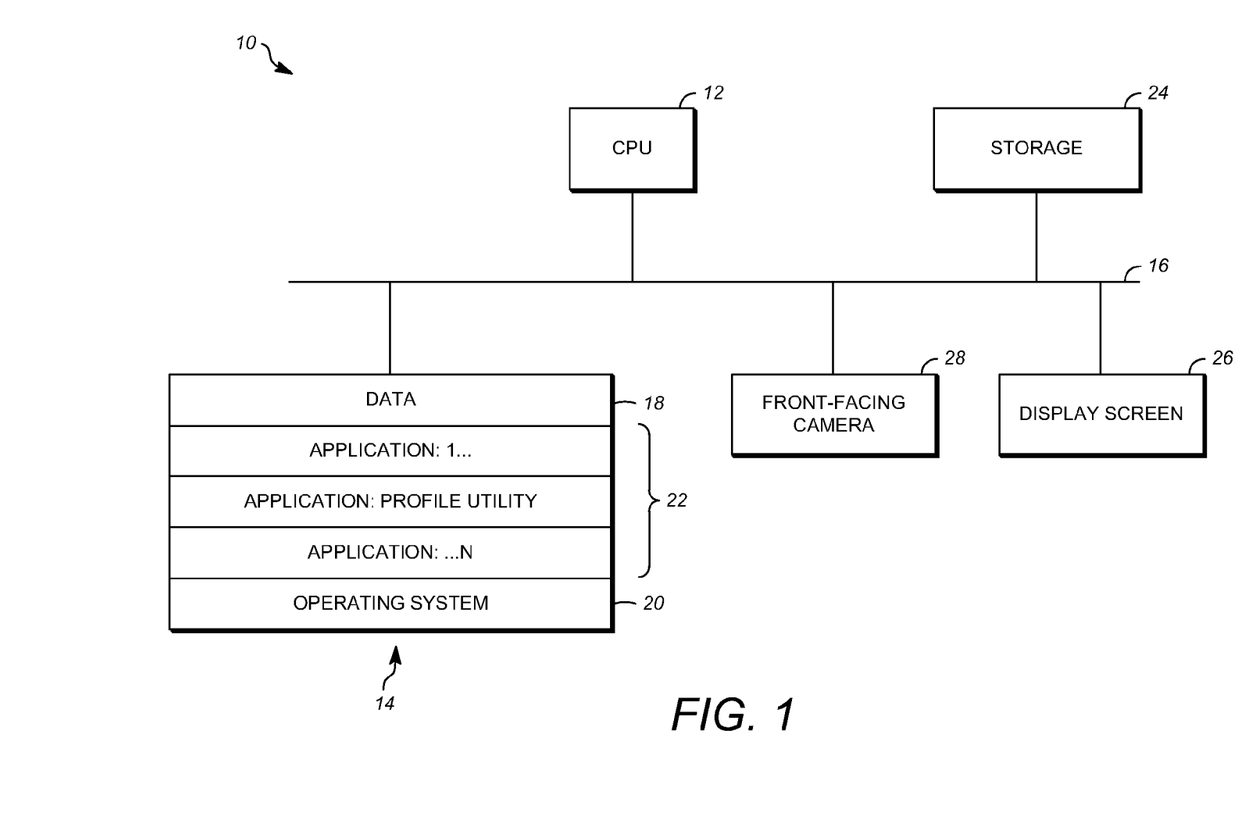
FIG. 1 is a block diagram showing an example of a computing device.

FIG. 1 is a block diagram of an example of a computing device 10. The computing device 10 can be in the form of a computing system including multiple computing devices, or in the form of a single computing device, for example, a mobile phone, a tablet computer, a laptop computer, or a notebook computer. The computing device can also be coupled to other objects. For example, the computing device can be coupled to or part of a lock to a door, a lock to a car, the entry to a room, the espresso machine, the self-service kiosk, or any other type of computing device now existing or hereafter developed capable of capturing and sending information.

The computing device 10 can include a data processing apparatus, which in this case is a central processing unit, CPU 12, and a memory 14. As an example, the CPU 12 can be a conventional central processing unit. Alternatively, the CPU 12 can be any other type of device, or multiple devices, capable of manipulating or processing information now-existing or hereafter developed, including, for example, optical processors, quantum and/or molecular processors, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any of the foregoing, either singly or in combination. Although the disclosed embodiments can be practiced with a single processor as shown, e.g. CPU 12, they can also be practiced using more than one processor.

The memory 14 in the computing device 10 can be a random access memory device (RAM). Any other suitable type of storage device can be used as the memory 14. The memory 14 can include code and data 18 that is accessed by the CPU 12 using a bus 16. The memory 14 can further include an operating system 20 and application programs 22, the application programs 22 including programs that permit the CPU 12 to perform the methods described herein. For example, the application programs 22 can include applications 1 through N which further include a profile utility application that performs the methods described herein. The computing device 10 can also include a secondary storage 24, which can, for example, be a memory card used with a mobile computing device 10. Because the user profiles retrieved by the computing device 10 may contain a significant amount of information, they can be stored in whole or in part in the secondary storage 24 and loaded into the memory 14 as needed for processing.

The computing device 10 can also include one or more input-output devices, such as a display screen 26, which can be a touch sensitive display screen that combines a display with a touch sensitive element that is operable to sense touch inputs. The display screen 26 is coupled to the CPU 12 via the bus 16. Other input-output devices that permit a user to program the device, receive feedback about access to the device, or otherwise use the computing device 10 can be provided in addition to or as an alternative to the display screen 26. For example, the input-output device can include an LED that lights up as red or green indicating lack denial or grant of access. The input-output device can also transmit an audio signal, for example a user's favorite song or a personal greeting or warning, when access has been granted or denied to the computing device 10. When the input-output device is or includes a display screen, the display screen can be implemented in various ways, including by a liquid crystal display (LCD) or a cathode-ray tube (CRT) or light emitting diode (LED) display, such as an OLED display.

The computing device 10 can also include or be coupled to at least one image-sensing device, for example front-facing camera 28. The image-sensing device can also be a fingerprint, iris, palm print, or any other image-sensing device now existing or hereafter developed that can sense the image of a user operating the computing device 10. In some examples, more than one image-sensing device can be used to recognize a user of the computing device 10. In other examples, more than one image of the user can be taken by a single image-sensing device to aid in recognizing the user. If more than one image-sensing device is used to recognize a user of a computing device 10, the image-sensing devices can each capture one or more images of the user from different viewpoints or by different methods as described above. Multiple images can improve accuracy of recognition.

When the image sensing device is a front-facing camera 28, the front-facing camera 28 can be positioned such that it is directed toward a user that is operating the computing device 10. The position and optical axis of the front-facing camera 28 can be configured such that the field of vision of the front-facing camera 28 includes an area that is directly adjacent to the display screen 26, from which the display screen 26 is visible. The front-facing camera 28 can be configured to receive images, for example, of the face of a user while the user is operating the computing device 10.

Although FIG. 1 depicts the CPU 12 and the memory 14 as being integrated into a single unit, other configurations can be utilized. The operations of the CPU 12 can be distributed across multiple machines (each machine having one or more of processors) which can be coupled directly or across a local area or other network. The memory 14 can be distributed across multiple machines such as network-based memory or memory in multiple machines performing the operations of the computing device 10. Although depicted here as a single bus, the bus 16 can be composed of multiple buses. Further, the secondary storage 24 can be directly coupled to the other components of the computing device 10 or can be accessed via a network and can comprise a single integrated unit such as a memory card or multiple units such as multiple memory cards. The computing device 10 can thus be implemented in a wide variety of configurations.

Figure 2A:
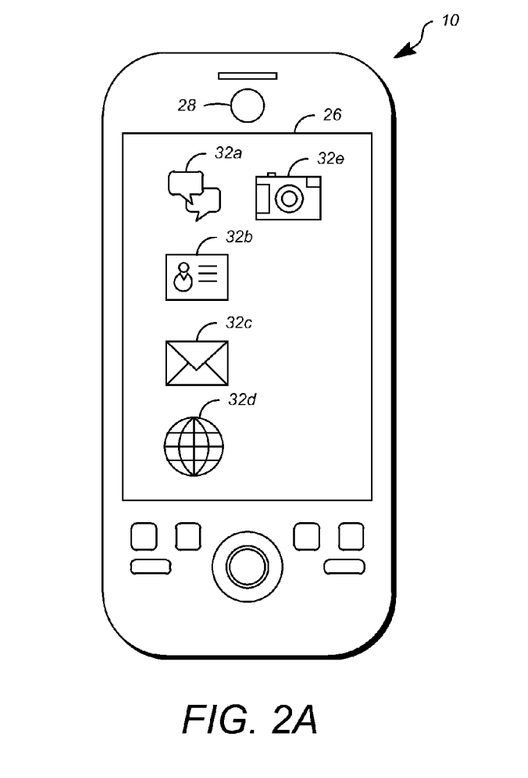
FIGS. 2A and 2B are illustrations showing the operation of a profile utility application as displayed on the display screen of a computing device.
Figure 2B:
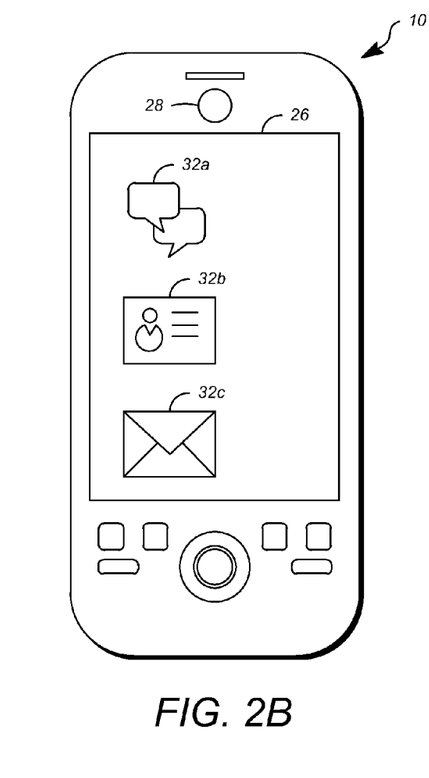

FIGS. 2A and 2B are illustrations showing the operation of a profile utility application as displayed on the input-output device, in this case a display screen 26, of a computing device 10. The computing device 10 includes the image-sensing device, in this case the front-facing camera 28, described in FIG. 1. The front-facing camera 28 faces the user while the user operates the computing device 10 and is capable of receiving an image. The computing device 10 also includes various application programs 22 as described in FIG. 1. Icons 32a-e that render on the display screen 26 can represent a set of application programs 22 with each icon 32a-e being capable of selection by a user to operate a given application program 22 on the computing device 10.

Different users of the same computing device 10 can each establish a user profile which includes preferences for operating the computing device 10 associated with the user and the application programs 22 of interest or accessibility to the user. The computing device 10 can also include application programs 22 that communicate with devices external to the computing device 10. For example, the computing device 10 can include application programs 22 that communicate with the user's stereo, television, lighting, thermostat, or other device and set these external devices according to the user's preferences.

FIG. 2A shows the operation of a first user profile with the icons 32a-e representing five different application programs 22 that a first user can operate on the computing device 10 as associated with the first user profile. FIG. 2B shows the operation of a second user profile with the icons 32a-c representing three application programs 22 that a second user can operate on the computing device 10 as associated with the second user profile. User profiles can include different application programs 22 that are available to different users, different settings for the computing device 10 such as font size and icon 32a-e size as shown by comparing the icon 32a-c size between FIG. 2A and FIG. 2B, different files and folders as initiated and stored by different users, and different security and access settings that regulate what types of application programs 22 can be operated by the user on the computing device 10. For example, the first user profile shown in FIG. 2A has access to the Internet through icon 32d and to a camera through icon 32e, whereas the second user profile shown in FIG. 2B does not have icons enabling access to the Internet or to the camera.

Figure 3:
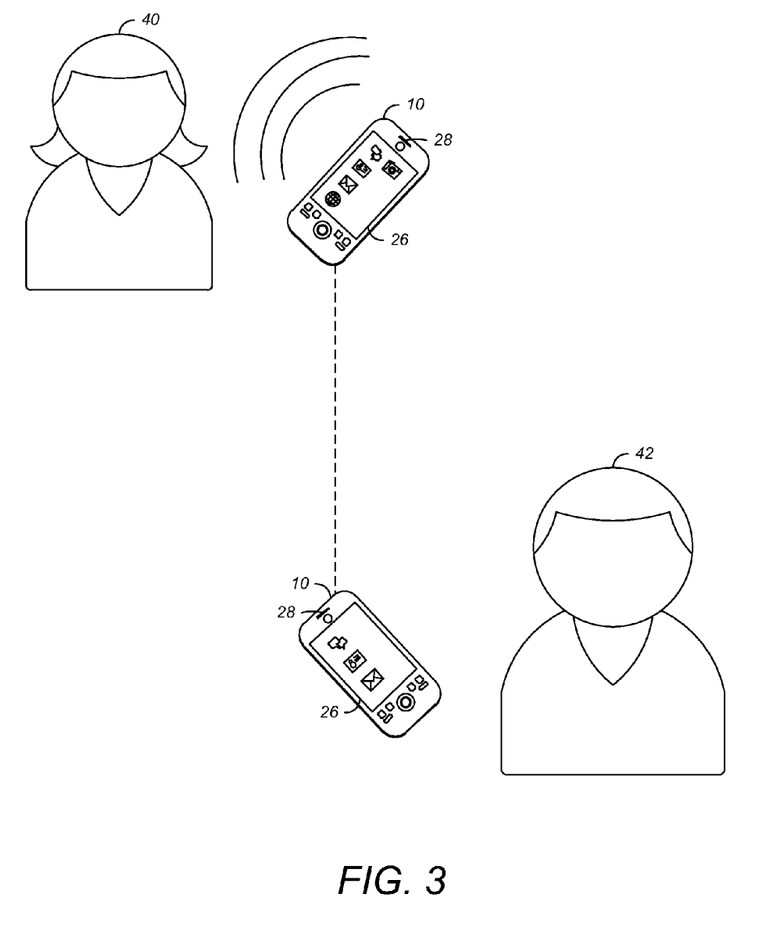
FIG. 3 is an illustration showing an operation in which a different user profile is selected for operation of the computing device.

FIG. 3 is an illustration showing operations in which different user profiles are selected for operation of the same computing device 10. In this example, a first user 40 and a second user 42 have both previously established user profiles on the computing device 10. The image-sensing device, in this example the front-facing camera 28, is operable to capture one or more images of the first user 40 when the first user 40 seeks to operate the computing device 10 by interacting with the display screen 26. The computing device 10 can configure at least some application programs 22 that are operating on the computing device 10 using a stored user profile that has been established by or for the first user 40 and is associated with the first user 40, e.g. a first user profile. The first user profile can include a value, a first user value, that represents the first user 40, such as an image of the first user's face, or data that is derived from or representative of the first user's face.

If the computing device 10 is handed to or picked up by the second user 42, the front-facing camera 28 can capture an image of the second user 42 when the second user 42 seeks to operate the computing device 10 by interacting with the display screen 26. The computing device 10 can configure at least some application programs 22 that are operating on the computing device 10 using a stored user profile that has been established by or for the second user 42 and is associated with the second user 42, e.g. a second user profile. The second user profile can include a value, a second user value, that represents the second user 42, such as an image of the second user's face, or data that is derived from or representative of the second user's face. Configuring the computing device 10 for the second user 42 can be performed without an affirmative action that "logs out" the first user 40, suspends operation of the computing device 10, or locks operation of the computing device 10.

In other examples, the first user 40 can be "logged out" of the device, or can step away from the device in which case the front-facing camera 28 can detect the absence of the first user 40 and lock the device. The first user 40 can also place the computing device 10 into a low-power state, a locked state, or any other state in which the computing device 10 is no longer in active use. The computing device 10 may or may not continue to be configured according to the first user profile while in the non-operating state. When the computing device 10 is picked up by the second user 42 in the non-operating state, the front-facing camera 28 can capture an image of the second user 42. The computing device 10 can configure at least some application programs 22 to operate on the computing device 10 using the second user profile if the computing device 10 determines that the image of the second user 42 corresponds to a value that is stored in the second user profile. That is to say that the second user profile is utilized to configure the computing device 10 if the second user profile is associated in some way with the captured image of the second user 42.

In other examples, a user may not have previously established a user profile on the computing device 10 or the computing device 10 can fail to retrieve a stored user profile having at least one stored user value associated with the image of the current user. In these examples, the computing device 10 can deny access to the user or can allow access by various methods that will be explained herein. The operations of the various methods of configuring the computing device 10 if the current user value does not correspond to the at least one stored user value are further explained in connection with FIG. 4 below.

Figure 4:
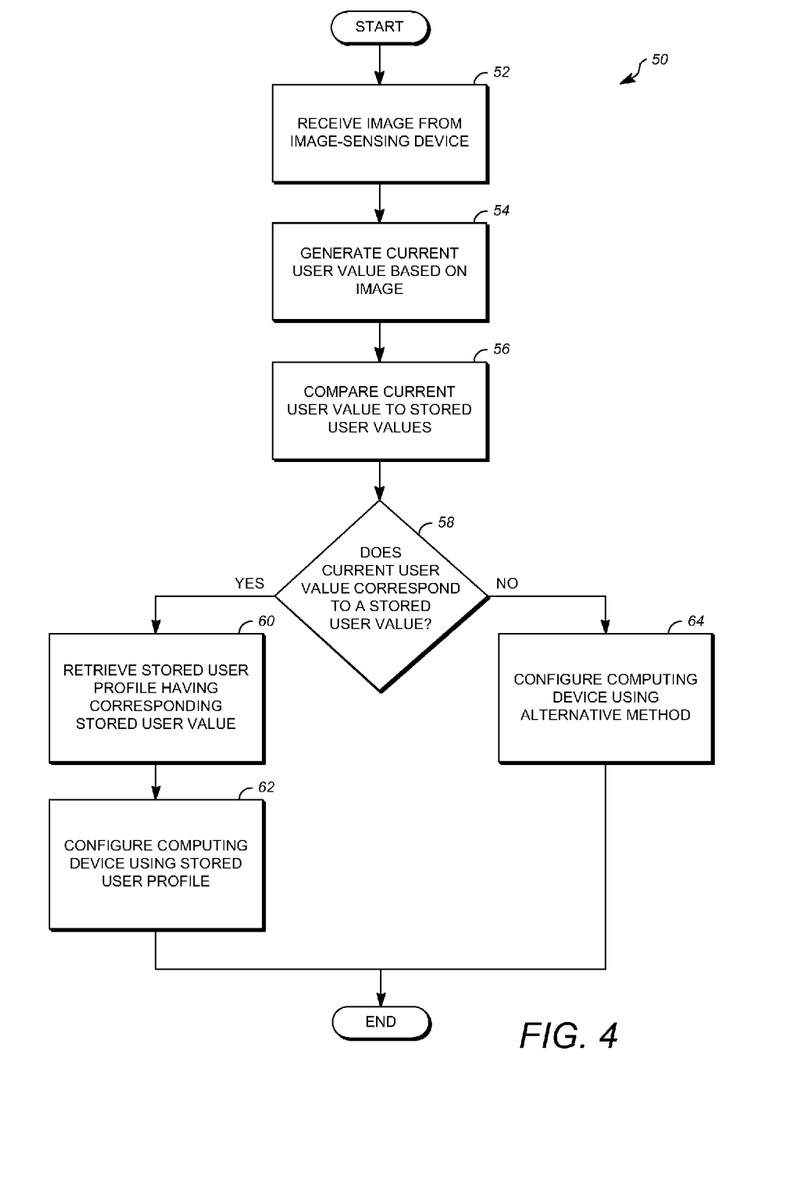
FIG. 4 is a flow chart showing a process for dynamically switching a user profile on a computing device.

FIG. 4 is a flow chart showing an example of a process 50 for dynamically switching a user profile on a computing device 10. In process 50, the computing device 10 can be operating using a stored user profile, can be in a low-power state, a locked state, or any other state in which the computing device is either operating or is not in active use.

In stage 52, the computing device 10 can receive an image from the front-facing camera 28. The image received can be that of the face of the current user of the computing device 10. For example, an image of the current user can be captured by the image-sensing device, e.g. the front-facing camera 28, on the computing device 10.

In stage 54, the computing device 10 can generate a current user value indicative of the current user of the computing device 10 based on the image received in stage 52. For example, the current user value can be generated by a facial recognition application program detecting one or more specific positions, or coordinates, of facial features (e.g. corners of the eyes, corners of the mouth, top and bottom edges of the lips, etc.). Other facial features and positions are also possible and can be detected by the facial recognition application to generate the current user value. The facial recognition application program can also detect if more than one face is captured by the front-facing camera 28 and send a request for recapture of the image to isolate a current user.

In stage 56, the computing device 10 can compare the current user value to a plurality of stored user values indicative of users having stored user profiles associated with the stored user values. For example, the computing device 10 can compare the coordinates of facial features of the current user value to each of the stored user values that are associated with the stored user profiles. A stored user profile can have a single stored user value or multiple stored user values. For example, in a given stored user profile, one stored user value can represent the user when wearing glasses and a second stored user value can represent the same user without glasses.

In decision block 58, the computing device 10 can make a determination as to whether the current user value corresponds to the at least one stored user value. For example, the computing device 10 can determine if a coordinate comparison between the current user value and one of the stored user values indicates that the coordinates are similar enough to indicate to the computing device 10 that the current user has the same identity as a stored user having a stored user profile, the stored user profile being available to configure the computing device 10.

If, at decision block 58, the computing device 10 determines that the current user value corresponds to at least one of the stored user values, the computing device 10 can retrieve the stored user profile having the stored user value corresponding to the current user value at stage 60. The computing device 10 can then configure at least some programs operating on the computing device 10 using the retrieved user profile at stage 62. If the computing device 10 configures at least some programs using the retrieved user profile, the process 50 ends. If the current user was also the last user to operate the computing device 10, the current user need not be aware that the process 50 has occurred, allowing seamless operation of the computing device 10. Stages 52 through 56 and decision block 58 of process 50 can occur periodically, at a set interval or prompt by an application program, or continuously during the operation of the computing device 10.

If, at decision block 58, the computing device 10 determines that the current user value does not correspond to at least one of the stored user values, the computing device 10 can be configured to operate at least some programs using an alternative method at stage 64, and the process 50 ends. There are several embodiments of the alternative methods of stage 64 that will be described below.

In one embodiment of stage 64 where the current user value does not correspond to the at least one stored user value of any of the plurality of stored user profiles, the computing device 10 can configure at least some programs operating on the computing device using a guest profile. The guest profile can have limited access to application programs, files, folders, etc. This embodiment allows a current user without a stored user profile to operate the computing device 10 without exposing the security settings, files, folders, application programs, etc. of stored user profiles to the current user.

In another embodiment of stage 64 where the current user value does not correspond to the at least one stored user value, the computing device 10 can display one or more indicators, wherein each indicator of the one or more indicators is associated with a respective stored user profile of the plurality of stored user profiles. The current user can select an indicator using the user interface of the computing device 10. The computing device 10 can receive a signal that the current user has selected an indicator of the one or more indicators, and the computing device 10 can retrieve the user profile having a user value associated with the selected indicator. Finally the computing device 10 can configure at least some programs using the retrieved user profile.

Displaying indicators when the current user value does not correspond to the at least one stored user value is useful in the case where there are changes to the physical features of the current user, for example, changes in facial hair, low lighting during the image capture, changes in eyeglasses for the current user, or other temporary or permanent changes in appearance, etc. The computing device 10 can further display a request for a security measure to access the selected user profile. The security measure can be one of a password, personal identification number (PIN), or unlock sequence if the current user selects a stored user profile from an indicator because the current user value failed to correspond to a stored user value. The computing device 10 can receive the signal corresponding to the security measure for the selected user profile before retrieving the selected user profile.

In another embodiment of stage 64 where the current user value does not correspond to the at least one stored user value, the computing device 10 can display an interface for establishing a user profile for the current user. This embodiment allows a current user without a stored user profile to configure their own user profile on the computing device 10 specifying the security settings, applications programs, etc. the current user prefers to use while operating the computing device 10 without exposing the security settings, files, folders, application programs, etc. of stored user profiles to the current user.

In each of the embodiments of the process 50 for dynamically switching a user profile on a computing device 10, the plurality of stored user profiles can be stored in a location external to the computing device 10. For example, a computing device 10 can be a public device such as a clock-radio in a hotel room capable of operating with user profiles. The current user of the clock-radio can have a user profile stored using a cloud computing service, or the cloud. The cloud can include hundreds or thousands of servers configured to provide scalable computing resources. Storing a user profile on the cloud can, for example, allow more than one computing device 10 to access the user profile. In clock-radio example, the current user of the clock-radio can access personal files, folders, and/or application programs on the clock-radio after the clock-radio has been configured with the stored user profile associated with the current user.

The embodiments of the computing device 10 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of computing device 10 do not necessarily have to be implemented in the same manner.

In one embodiment, the computing device 10 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of operating a computing device coupled to at least one image-sensing device and using a plurality of stored user profiles, each stored user profile associated with at least one stored user value indicative of a user, the method comprising:
   receiving at least one first image from the at least one image-sensing device;
   generating a current user value indicative of a current user of the computing device based on the at least one received first image;
   determining if the current user value corresponds to the at least one stored user value from one of the stored user profiles;
   retrieving the stored user profile having the stored user value corresponding to the current user value if the current user value corresponds to the at least one stored user value;
   configuring at least some programs operating on the computing device using the retrieved user profile; and
   configuring at least some programs operating on the computing device using a guest profile if the current user value does not correspond to the at least one stored user value;
   configuring at least some programs operating on a device external to the computing device using the retrieved user profile; and
   setting the computing device in a locked state when at least one second image that indicates an absence of the current user is received from the image-sensing device.

2. The method of claim 1, further comprising:
   displaying a request for a security measure to access the selected user profile; and
   receiving a signal corresponding to the security measure for the selected user profile.

3. The method of claim 2 wherein the security measure is one of a password, personal identification number, or unlock sequence.

4. The method of claim 1 wherein the stored user profiles are stored in a location external to the computing device.

5. A method of operating a computing device coupled to at least one image-sensing device and using a plurality of stored user profiles, each stored user profile associated with at least one stored user value indicative of a user, the method comprising:
   receiving at least one first image from the at least one image-sensing device;
   generating a current user value indicative of a current user of the computing device based on the at least one received first image;
   determining if the current user value corresponds to the at least one stored user value from one of the stored user profiles;
   retrieving the stored user profile having the stored user value corresponding to the current user value if the current user value corresponds to the at least one stored user value;
   configuring at least some programs operating on the computing device using the retrieved user profile;
   displaying an interface for establishing a user profile for the current user if the current user value does not correspond to the at least one stored user value;
   configuring at least some programs operating on a device external to the computing device using the retrieved user profile; and
   setting the computing device in a locked state when at least one second image that indicates an absence of the current user is received from the image-sensing device.

6. The method of claim 5, further comprising:
   displaying a request for a security measure to access the selected user profile; and
   receiving a signal corresponding to the security measure for the selected user profile.

7. The method of claim 6 wherein the security measure is one of a password, personal identification number, or unlock sequence.

8. The method of claim 5 wherein the stored user profiles are stored in a location external to the computing device.

9. A method of operating a computing device coupled to at least one image-sensing device and using a plurality of stored user profiles, each stored user profile associated with at least one stored user value indicative of a user, the method comprising:
   receiving at least one image from the at least one image-sensing device;
   generating a current user value indicative of a current user of the computing device based on the at least one received image;
   determining if the current user value corresponds to the at least one stored user value;
   retrieving the stored user profile having the stored user value corresponding to the current user value if the current user value corresponds to the at least one stored user value;
   configuring at least some programs operating on the computing device using the stored user profile if the stored user profile is retrieved;
   displaying at least one indicator of at least one stored user profile for selection by the current user if the current user value does not correspond to the at least one stored user value;
   receiving a signal selecting a stored user profile;
   retrieving the selected user profile; and
   configuring at least some programs operating on the computing device using the retrieved user profile;
   configuring at least some programs operating on a device external to the computing device using the retrieved user profile; and
   setting the computing device in a locked state when at least one second image that indicates an absence of the current user is received from the image-sensing device.

10. The method of claim 9, further comprising:
displaying a request for a security measure to access the selected user profile; and
receiving a signal corresponding to the security measure for the selected user profile.

11. The method of claim 10 wherein the security measure is one of a password, personal identification number, or unlock sequence.

12. The method of claim 9 wherein the stored user profiles are stored in a location external to the computing device.

13. A computing device using a plurality of stored user profiles, each stored user profile associated with at least one stored user value indicative of a user, the computer device comprising:
an input-output device; at least one image-sensing device; a memory; and
one or more processors wherein the one or more processors are configured to execute instructions stored in the memory to:
receive at least one image from the at least one image-sensing device;
generate a current user value indicative of a current user of the computing device based on the at least one received image;
determine if the current user value corresponds to the at least one stored user value;
retrieve the stored user profile having the stored user value corresponding to the current user value if the current user value corresponds to the at least one stored user value;
configure at least some programs operating on the computing device using the retrieved user profile;
configure at least some programs operating on the computing device using a guest profile if the current user value does not correspond to the at least one stored user value;
configure at least some programs operating on a device external to the computing device using the retrieved user profile; and
set the computing device in a locked state when at least one second image that indicates an absence of the current user is received from the image-sensing device.

14. The computing device of claim 13, wherein the processor is further configured to:
display a request for a security measure to access the selected user profile; and
receive a signal corresponding to the security measure for the selected user profile.

15. The computing device of claim 14 wherein the security measure is one of a password, personal identification number, or unlock sequence.

16. The computing device of claim 13 wherein the stored user profiles are stored in a location external to the computing device.

* * * * *